Patented May 14, 1940

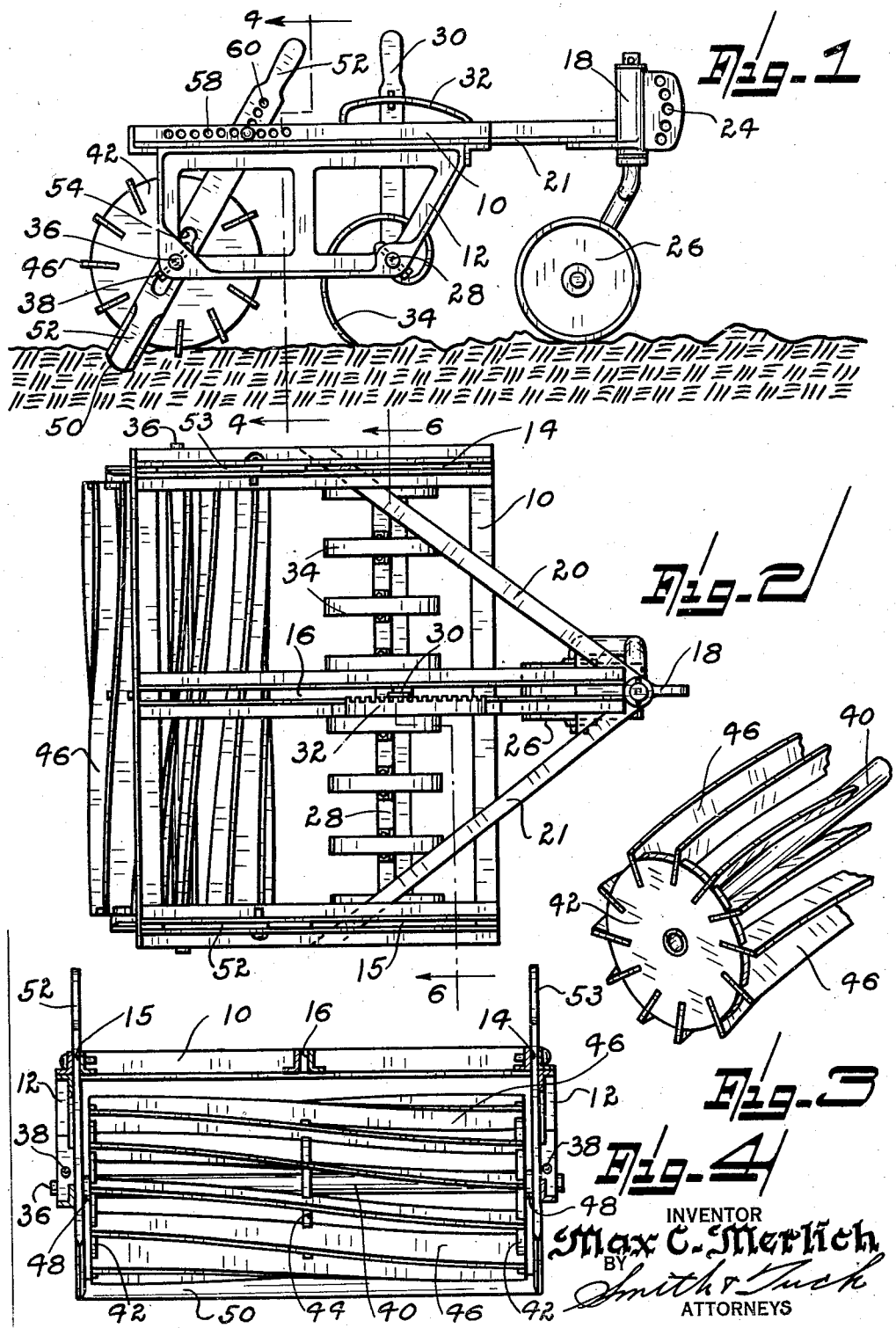

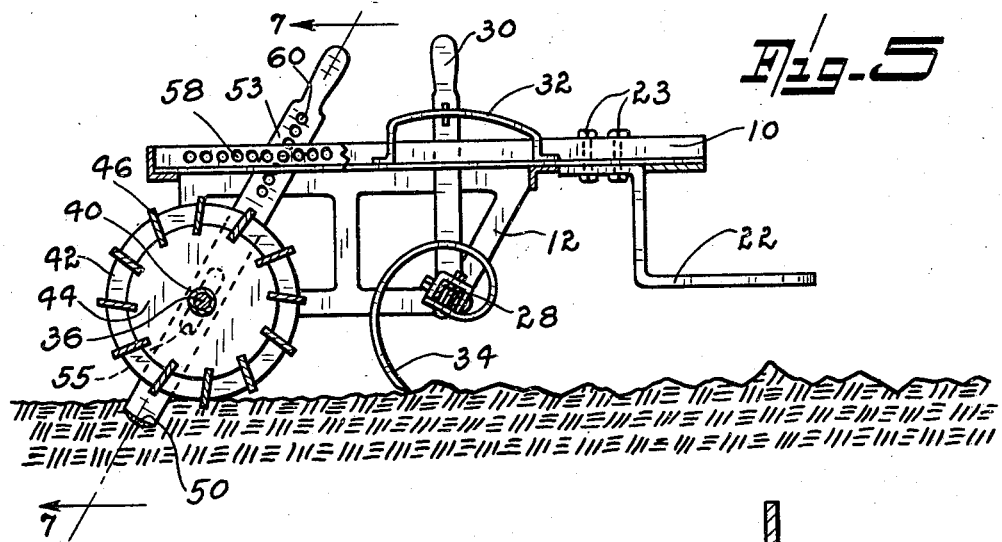
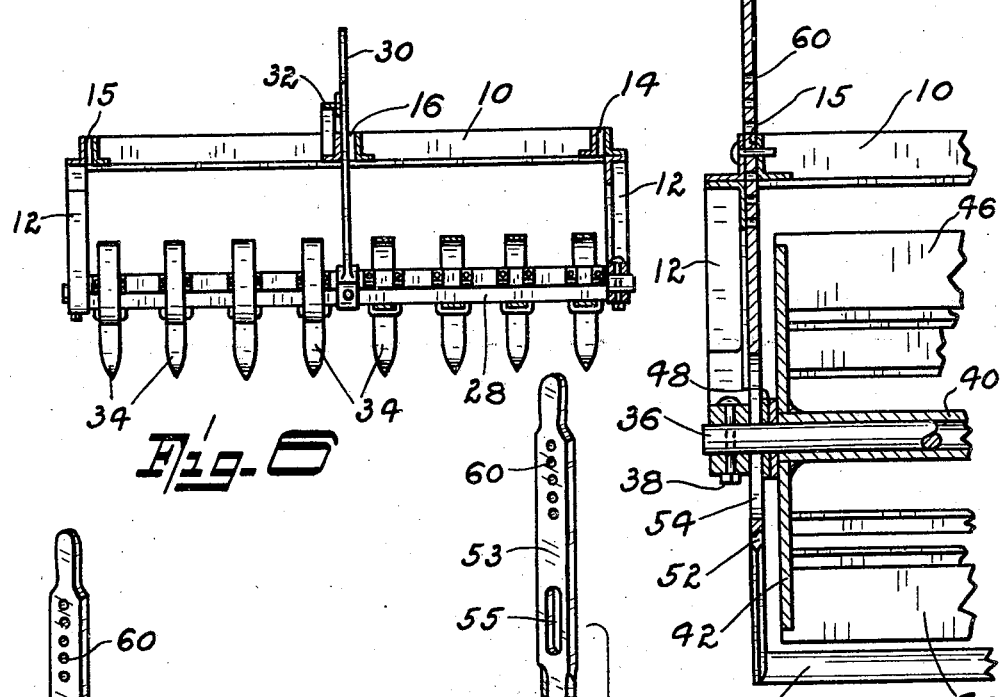
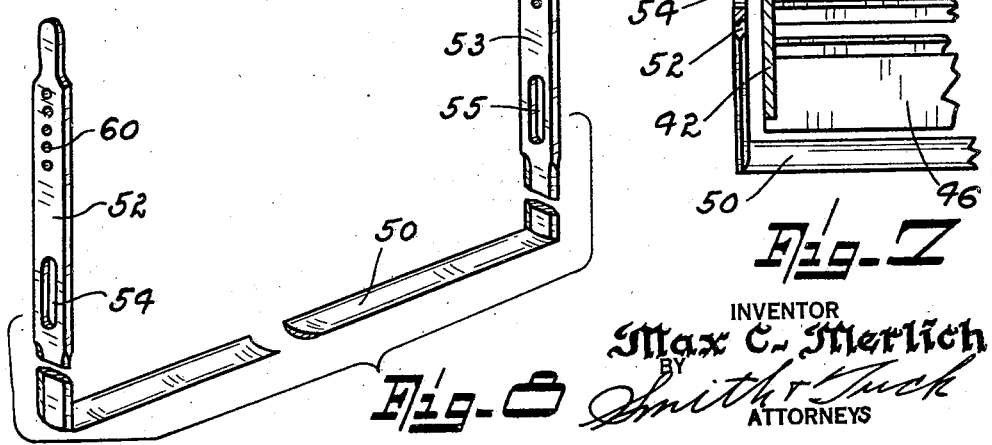

2,200,631

UNITED STATES PATENT OFFICE 2,200,631

SOIL CONDITIONER

Max C. Merlich, Poulsbo, Wash.

Application March 16, 1939, Serial No. 262,241

5 Claims. (Cl. 97—52)

My present invention relates to the general class of soil tilling instruments such as are normally used on farms and more particularly to a unit soil conditioner.

My invention consists essentially of a unit frame having operably disposed therein means for loosening and preparing previously plowed ground for use as a seed bed. This I accomplish by providing, first a spring-tooth harrow which turns up the soil in the form of lumps or clods. Immediately following this loosening harrow, I provide a rotary clod cutter or pulverizer having a large number of, preferably, spirally arranged cutter blades or bars. Disposed generally beneath the spool is a transversely disposed sub-soil knife or cutter bar which co-acts with the rotary pulverizer, to thoroughly work and pulverize the soil.

In farming, particularly on smaller farms it is desirable to reduce the soil to a seed bed with the minimum of effort. In the past this has usually been accomplished by plowing the ground, and then following this operation by disking one or more times so as to break up the furrows thus turned and then going over the ground repeatedly with one or more implements. This, in itself, is probably not particularly objectionable, were it not for the fact that, in order to preserve its moisture, it is at times desirable to merely go over a piece of ground, and then quickly reduce it to a mulch surface; but when it is necessary to use several different implements, the time lapse between the successive operations often permits the ground to dry out. With my present device the soil can be reduced to a seed bed with only one operation after the initial plowing.

My present implement successfully breaks the clods by the downward action of the cutter-bars on the rotary cutter or pulverizer and this action is assisted by the sub-surface, transversely disposed drag knife, which tends to bring the clods up and present them in a proper position for engagement with the rotary cutter bars.

My device is particularly adapted for uprooting and breaking up tufts, especially where heavy rooted structures are met, such as quack grass, Canadian thistle and the like. Under such conditions the spring teeth tend to dig into the ground and bring these tufted masses to the surface; then the co-action of the transverse knives and the spool cutters will tear these tufts apart, releasing the soil contained therein, pulverizing it, and depositing the roots on the surface of the ground where normally the exposure to the elements will be sufficient to cause them to die.

The implement of my invention is also useful in breaking up and turning under manure or other fertilizers, the action being such as to spread the fertilizer evenly over the ground and then to cut into small fragments and thoroughly intermingle these fragments with the soil, producing an ideal treatment.

The same type of operation can be employed by farmers to cover up seed that has been sown broadcast upon the ground. When this operation is performed with my machine, it results in a seed bed in which the seed are very thoroughly intermingled with the ground, and by proper adjustment the seeds can be worked into whatever depth has been proved to be the most satisfactory for the crop and ground conditions.

The principal object, therefore, is to provide a soil-conditioning device that will normally provide the thorough pulverization of the ground in a single trip over the same, leaving it finely divided and ready for sowing.

A further object is the provision of a machine which can be made very simply and, because of its simple structure, will give the maximum of service with the least repair or replacement, and further, will be economical in first cost.

Still another object of my present invention is to provide a soil-conditioner which leaves the ground as a level swath, so that the little hummocks and potholes so common in such ground will be thoroughly leveled or, thus providing ground from which crops can be harvested with the greatest ease.

Other and more specific objects will be apparent from the following description taken in connection with the accompanying drawings, wherein Figure 1 is a side elevation of my device showing the same with a caster wheel and draft means such as are best adapted for use with horses.

Figure 2 is a top plan view of the structure of Figure 1.

Figure 3 is a perspective view showing a portion of the spool or rotary cutter.

Figure 4 is a view taken along the line 4—4 of Figure 1 showing the general construction and arrangement of the spool.

Figure 5 is a vertical sectional side view of my device.

Figure 6 is a cross-sectional view taken along the line 6—6 of Figure 2.

Figure 7 is an enlarged, vertical, sectional view taken along the line 7—7 of Figure 5.

Figure 8 is a bracketed, perspective view showing the transverse cutter knife, the same being shown as broken away in parts in order to increase the scale of the essential parts.

Referring to the drawings, throughout which like reference characters indicate like parts, 10 designates generally the frame of my device. This I prefer to form by using two cast side members 12 which are joined together with suitable transversely disposed structured shapes and so arranged that guideways are provided at 14, 15 and 16, for the control levers used; the structural members forming the guideway 16 are carried out to the hitch member 18, and to provide maximum rigidity with the minimum of weight, I provide the truck members as 20 and 21. Guideway 16 forms a very convenient mounting means for a seat, if the same is desired, or for the attachment of a tractor fastening, after the showing of Figure 5, wherein draft bar 22 is clamped to the frame by bolts at 23, which pass through guideway 16. In this manner a clamp is provided which permits of longitudinal adjustment of the draft member. Where horses are used to draw the implement, the form shown in Figure 1 has proved very satisfactory in that the draft member is provided with a plurality of holes shown at 24 so the attachment of the double-tree can be varied to suit varying conditions, and the caster wheel 26 serves to vertically position the front end of the entire device so as to assure uniform operation of the implements. Adapted for limited rotation within the side frame members 12 is a transverse shaft assembly 28. This shaft rocks within the frame members and is held in adjusted position by lever 30 and quadrant 32, and has secured to the shaft, after the showing of Figures 5 and 6, a plurality of relatively heavy spring teeth 34. Disposed as close to shaft 28 as reasonable clearance will permit, is a second transverse shaft 36. This shaft is, preferably, fixedly secured to the side frame members as by the screw bolts 38. Disposed upon shaft 36 is a tube 40 which normally forms a bearing throughout its length on shaft 36. This construction has proved satisfactory in that the tube revolves slowly on shaft 36 and can by modern pressure lubrication be so entirely filled with lubricant that it will run for long periods with a minimum of friction and virtually no wear.

Tube 40 forms the primary connecting means between the two end plates 42 of the spool or rotor, which plates are preferably welded to tube 40. It also forms a base for attachment of the intermediate plate 44, which is found desirable whenever the length of the cutter bars or knives 46 exceeds thirty or thirty-six inches. In fact, if it were desirable under certain conditions to form a rotor of considerable length, a stiffener of this order should be inserted at frequent intervals. Knives or cutter bars 46 should be formed of a good carbon steel so they will not wear rapidly, and will have the resiliency necessary to prevent their fracture during use.

The cutter bars 46 are secured, as by welding, into slots formed in end plates 42. This structure is possibly best shown in Figure 3. Here the bars are well embedded in the end plates, leaving only a small amount extending beyond the periphery of the plate. When so arranged, any tendency for the plate to bend through torsion is arrested so that, even though they may be deflected in their intermediate portions, they will tend at all times to come back to normal. With this thought in mind, the center supporting plates as 44, are preferably arranged to engage only the inner margin of each of the cutter bars, just sufficiently so as to key them to the plate; a half inch or so is usually adequate. These should then be welded in place. This construction permits the working edge of the bars to be deflected somewhat as may become necessary when the bars strike rocks and the like. The rotor assembly is spaced between side frames 12, preferably by washers, indicated at 48. At this point could also be inserted packing rings if desired, although under normal use they have not been found necessary.

Disposed to pivot about shaft 36 is a transverse cutting knife 50. This knife in section is curved, as will be observed from Figures 5 and 8, so as to provide a modified moldboard action which is found to be very desirable in turning over the soil, particularly when the device is used to bury seed. Under ordinary use, however, it loosens up the ground immediately under the cutting blades 46, and greatly assists in a thorough pulverization of clods and root tufts. The knife is sharpened, preferably, on both edges so as to be reversible. At each end knife 50 is provided with an upturned portion as 52 and 53. These upturned portions are sharpened for a short distance on their two edges, as is illustrated in Figure 7; usually six or eight inches is sufficient. Above this sharpening, slots are provided, as 54 and 55. These slots are sufficiently wide so as to ride over shaft 36, and are of sufficient length to permit the vertical adjustment of knife 50 with respect to shaft 36, so that the knife can be adjusted throughout a considerable range, as has been found desirable for different types of soils and obstructions.

Knife 50 is arranged so as to provide a vertical and angular adjustment. In the present showing this is accomplished by providing a plurality of horizontally disposed holes 58 in frame 10, and to provide a plurality of vertically disposed holes 60 in the two levers 52 and 53. In this manner it will be observed that the knife may be adjustably positioned both for depth, with respect to axle 36, and this, of course, changes the clearance between cutter bars 46 and knife 50; and for longitudinal position with respect to shaft 36, so as to properly serve the wide range of conditions that an implement of this order will encounter. It is particularly desirable to point out the intimate co-action between the various elements of my invention, as when it is in use the clods, lumps, or tufts that are picked up by the spring teeth 34 are in many instances thrown up on the spool, so that they tend to work through the spool. This action would not be accomplished if the machine were run over ground after a spring-tooth harrow, for instance. Further, the co-action between knife 50 and the spool rotor accounts for the thorough pulverization of lumps and, in the case of sod, the beating out or separation of the soil from the root structure. It will be apparent, too, that with knife 50 adjusted close to bar 46 a very pronounced tearing or shredding action is accomplished, which action could not be obtained by the use of units separate from each other.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. In an agricultural implement, the combination with a main frame and lower side frames, and a rotatably adjustable spring-tooth harrow mounted in the side frames, of an axle mounted in the rear ends of the side frames, a rotary clod-cutter having a tubular shaft journaled on the axle between the side frames, a sub-soil drag-cutter having slotted side arms mounted on the axle and a cutting-blade beneath the rotary cutter, means co-acting with the slotted side arms and main frame for retaining the drag-cutter in vertical adjusted position, and means for adjusting the drag-cutter on the axle as a center toward the front or rear of the rotary cutter.

2. In an agricultural implement, the combination with a main frame and side frames, and a transverse axle mounted in the side frames, of a rotary clod cutter having a tubular shaft and journaled on the axle, a sub-soil drag-cutter having spaced slotted arms pivotally mounted on the axle and a cutter-blade rigid with the slotted arms, said main frame and at least one of said slotted arms each having a series of bolt holes adapted to register, and a retaining bolt for two registered holes.

3. In an agricultural implement, the combination with a main frame and side frames, a transverse axle mounted in the side frames, and a rotary clod-cutter having a tubular shaft journaled on the axle, of a sub-soil reversible drag-cutter having rigid spaced upright side arms, said side arms being longitudinally slotted and pivotally supported on the axle, a cutter-blade rigid with the lower ends of the side arms, said main frame having two series of bolt holes and said side arms each having a series of bolt holes adapted to register with the frame-holes, and retaining bolts for rigidly securing the side arms to the main frame.

4. In an agricultural implement having side frames and an axle rigid therewith, the combination with a rotary clod cutter having a tubular shaft journaled on the axle, spaced transverse heads rigid with the shaft, circumferentially spaced, spirally arranged cutter blades rigid with said heads, and intermediate braces between said heads, of a sub-soil drag cutter pivotally supported on the axle and having a cutting-blade beneath the clod-cutter, and means for vertically and longitudinally adjusting said drag cutter.

5. In an agricultural implement having side frames and an axle rigid therewith, the combination with a rotary clod-cutter having a tubular shaft journaled on the axle, end-heads rigid with said shaft, circumferentially spaced spirally arranged cutter blades rigidly mounted on said heads, intermediate braces between said heads having shallow peripheral notches in which the inner edges of the blades are fixed, whereby the blades may flex, of a sub-soil drag-cutter pivotally mounted on the axle near its ends, and means for vertically and longitudinally adjusting said drag cutter with relation to the rotary clod-cutter.

MAX C. MERLICH.